(12) United States Patent
Cove et al.

(10) Patent No.: US 8,528,299 B2
(45) Date of Patent: Sep. 10, 2013

(54) METHOD OF ANCHORING A CONNECTOR, AND CONNECTOR

(75) Inventors: Peter L. Cove, Romsey (GB); William R. Valance, Marlow (GB); Mario Lehmann, Les Pommerats (CH); Laurent Torriani, Lamboing (CH)

(73) Assignee: Woodwelding AG, Zug (CH)

( * ) Notice: Subject to any disclaimer, the term of this patent is extended or adjusted under 35 U.S.C. 154(b) by 0 days.

(21) Appl. No.: 13/140,206

(22) PCT Filed: Dec. 23, 2009

(86) PCT No.: PCT/CH2009/000409
§ 371 (c)(1),
(2), (4) Date: Aug. 18, 2011

(87) PCT Pub. No.: WO2010/072009
PCT Pub. Date: Jul. 1, 2010

(65) Prior Publication Data
US 2011/0296788 A1   Dec. 8, 2011

Related U.S. Application Data

(60) Provisional application No. 61/140,255, filed on Dec. 23, 2008.

(51) Int. Cl.
*E04B 1/00*   (2006.01)
(52) U.S. Cl.
USPC ................. 52/745.21; 52/376; 52/787.1
(58) Field of Classification Search
USPC ............. 52/745.21, 787.1, 364, 376, 704, 52/783.1
See application file for complete search history.

(56) References Cited

U.S. PATENT DOCUMENTS

| 3,308,585 | A | * | 3/1967  | Fischer ..................... 405/259.5 |
| 3,646,981 | A | * | 3/1972  | Barnes ............................ 411/82 |
| 3,651,563 | A | * | 3/1972  | Volkmann ...................... 29/523 |
| 4,265,688 | A | * | 5/1981  | Gorski ......................... 156/73.1 |
| 4,320,984 | A | * | 3/1982  | Mayer et al. .................. 403/292 |
| 4,675,972 | A | * | 6/1987  | Bappert et al. ............ 29/525.12 |
| 4,712,957 | A | * | 12/1987 | Edwards et al. ............. 411/82.1 |
| 4,800,643 | A | * | 1/1989  | Higgins .......................... 29/458 |
| 4,817,264 | A | * | 4/1989  | Worthing ........................ 29/512 |

(Continued)

FOREIGN PATENT DOCUMENTS

| JP | 07 100934   | 4/1995 |
| WO | 03/046390   | 6/2003 |
| WO | 2008/034278 | 3/2008 |
| WO | 2008/080238 | 7/2008 |

*Primary Examiner* — William Gilbert
*Assistant Examiner* — James Ference
(74) *Attorney, Agent, or Firm* — Rankin, Hill & Clark LLP

(57) ABSTRACT

A method of anchoring a connector in a lightweight building element is provided. The connector includes a sleeve element and a piston element with a shaft portion, wherein the shaft portion is guided by the sleeve element. The piston element and/or the sleeve element includes a thermoplastic material at least at an interface portion between the head portion and the sleeve portion. The method includes the steps of providing the connector, of providing a through hole in the first building layer of the lightweight building element, of inserting the connector through the through hole and until a distal portion rests against the second building layer. Therein, it may be the sleeve element or the piston element or both, the sleeve element and the piston element that rest(s) against the second building layer.

20 Claims, 6 Drawing Sheets

(56) References Cited

U.S. PATENT DOCUMENTS

| | | | |
|---|---|---|---|
| 5,093,957 A * | 3/1992 | Do | 16/2.1 |
| 5,209,805 A * | 5/1993 | Spraggins | 156/423 |
| 5,437,750 A * | 8/1995 | Rinse et al. | 156/73.1 |
| 5,713,706 A * | 2/1998 | Lozano | 411/171 |
| 6,055,790 A * | 5/2000 | Lunde et al. | 52/787.1 |
| 6,862,863 B2 * | 3/2005 | McCorkle et al. | 52/787.1 |
| 6,913,666 B1 * | 7/2005 | Aeschlimann et al. | 156/73.1 |
| 7,160,405 B2 * | 1/2007 | Aeschlimann et al. | 156/73.1 |
| 2006/0010830 A1 * | 1/2006 | Warren et al. | 52/787.1 |
| 2006/0113031 A1 * | 6/2006 | Langtry et al. | 156/293 |
| 2008/0047107 A1 * | 2/2008 | Clinch et al. | 16/404 |
| 2008/0109080 A1 * | 5/2008 | Aeschlimann et al. | 623/16.11 |
| 2008/0302060 A1 * | 12/2008 | Ciprian | 52/787.12 |
| 2009/0131947 A1 * | 5/2009 | Aeschlimann et al. | 606/93 |
| 2010/0043345 A1 * | 2/2010 | Aeschlimann et al. | 52/745.21 |

* cited by examiner

METHOD OF ANCHORING A CONNECTOR, AND CONNECTOR

For the USA, this application is a non-provisional patent application of U.S. provisional patent application No. 61/140,255 Dec. 23, 2008 incorporated herein by reference in its entirety.

FIELD OF THE INVENTION

The invention is in the field of lightweight building elements as used in construction and furniture industry. Especially, it concerns a method of anchoring a connector in a lightweight building element, and a connector for being anchored in a lightweight building element.

BACKGROUND OF THE INVENTION

Lightweight building elements—an important category of such elements are lightweight building boards—comprise two outer, comparably thin building layers, for example of fiberboard or of a metal, and an interlining arranged between the building layer, for example a cardboard honeycomb structure. Lightweight building elements of this kind are mechanically very stable, may look pleasant and have a very low weight.

However, because the building layers are thin and the interlining is not suitable for anchoring a connector—such as a dowel—in it, it is difficult to attach an object to the lightweight building elements other then just by gluing it to the element's surface. Also, in some cases the mechanical stability between the building layers provided by the interlining is insufficient, and additional means for providing the stability would be desired.

BRIEF SUMMARY OF THE INVENTION

It is an object of the present invention to provide a method of anchoring a connector that is suitable of being used for a lightweight building element, and an according connector.

According to an aspect of the invention, a method of anchoring a connector in a lightweight building element is provided. The connector comprises a sleeve element and a piston element with a shaft portion, wherein the shaft portion is guided by the sleeve element. The piston element and/or the sleeve element comprises a thermoplastic material at least at an interface portion between the head portion and the sleeve portion. The method comprises the steps of providing the connector, of providing a through hole in the first building layer of the lightweight building element, of inserting the connector through the through hole and until a distal portion rests against the second building layer. Therein, it may be the sleeve element or the piston element or both, the sleeve element and the piston element that rest(s) against the second building layer. The method then comprises the further step of coupling mechanical oscillations into the piston element while pressing the piston element towards the distal side, and thereby liquefying portions of the thermoplastic material at an interface portion between the sleeve element and the piston element while a periphery of the interface portion is adjacent the circumferential wall (or slightly distal with respect to it), and causing it to flow radially outward from the periphery and into structures of the first building layer and/or along an inner surface (i.e. surface facing towards the second building layer) of the first building layer. After re-solidification, the thermoplastic material portions form a positive-fit connection with the first building layer.

At least in the phase in which liquefaction at the named interface portion takes place, the sleeve element rests against the surface of the second building layer while the pressing force is applied to the piston element: the connector is "compressed" between the second building layer and the tool by which the pressing force is applied.

In accordance with this aspect, therefore, liquefaction of at least a part of the thermoplastic material liquefied in the process is effected at an interface between the sleeve element and the piston element and under the joint application of mechanical oscillations and a pressing force. It has been found that this approach, in contrast to liquefaction at a contact interface to the building material, as taught for example in U.S. Pat. No. 6,913,666, is sometimes easier to control, especially in view of the fact that the first building layer is comparably thin, lateral pressing forces would be difficult to apply, and anchoring in the first building layer and/or thereat is nevertheless desired.

Also, the liquefaction process leading to anchoring in and/or at the first building layer becomes independent on the properties, especially the mechanical strength of the material of the first building layer. Further, a shearing-off of thermoplastic material towards the proximal side is effectively prevented by the chosen approach.

As explained in more detail further below, in an embodiment preferred for many applications, this approach is combined with liquefaction of the thermoplastic material in contact with the second building layer at a second anchoring location. This leads to anchoring on two levels and consequently to an enhanced strength of the anchoring.

The lightweight building element may, for example, be a lightweight panel of the kind useable in furniture or building industry, or also another element comprising two building layers of a comparably dense material with an interlining—or an empty space—between them that is substantially lower in density. The building layers may be of identical or of different materials, possible materials including wood, wood composites such as fiberboard, metal (such as aluminum), plastics, or composites of these materials, such as a fiberboard coated by plastics, and any other suitable mechanically sufficiently stable material. The interlining—if any—may be a cardboard honeycomb, a foam material such as cellular plastics or a metal foam, an other soft insulating material (such as mineral wool), etc.

In the cases where the thermoplastic material portion flows into the structures of at least the first building layer, the building layer material comprises at least one of:
  Open pores in a surface;
  other structures in a surface (such as an arrangement of ridges with undercut); and
  a inhomogeneous characteristic with makes the penetration of a surface by a liquid under pressure possible, thereby creating pores filed by the liquid underneath the surface.

In addition or as an alternative, the building layer or building layers may comprise a thermoplastic coating or even consist of thermoplastic material. Then the thermoplastic material portion may be caused to be ultrasonically welded to the thermoplastic material of the building layer(s).

In addition or as an alternative, thermoplastic material may flow outward along the interior surface of the first building element into the space between the building layers, thereby possibly displacing interlining material (if present). This will create a blind rivet kind of effect that causes or enhances anchoring of the connector, and especially secures it against pulling forces. If the piston element and the sleeve element in addition are connected, in the anchoring process, by an ultrasonic welding effect (see below), the stability of the entire set-up may be additionally enhanced, especially if the sleeve is a hybrid metallic-nonmetallic sleeve.

The direction, in which the piston element is displaceable with respect to the sleeve element defines the axial direction. With respect to the axial direction, also a proximal and a distal side of the connector are defined, where "proximal" is closer to the position from where the connector is inserted and "distal" is further away, thus in the direction in which the connector is inserted.

The interface portion at which liquefaction takes place is not parallel to the axial direction. The piston element of the connector may comprise in addition to the shaft portion also a head portion of a greater diameter (in the general case where the connector is not necessarily rotationally symmetric, a "greater diameter" is to be understood to denote that the outer contour encompasses a greater area, the "diameter" generally may refer to the dimension of the area encompassed by the outer contour in section perpendicular to the axial direction). The distal end face of the head portion and the proximal end face of the sleeve element then together define, initially and/or during the anchoring process, this interface portion at which thermoplastic material is liquefied. Thus in the embodiments in which the piston element comprises a head portion, at least one of the piston element and of the sleeve element comprises thermoplastic material at said interface portion.

The head portion—if it is approximately equal in diameter to the through hole—in addition to providing the surface portion also has the function to seal off the configuration against liquefied material flowing to the proximal side and coming out of the through hole. Thereby, it eliminates the undesirable effects of thermoplastic material protruding above the surface on the proximal side, and it enhances the possible pressure—given a certain pressing force—onto the liquefied material and improves anchoring. However, because liquefaction takes place at the interface between the piston element and the sleeve element, tolerances between the size of the through hole and the head portion diameter are not critical.

The axial extension (thickness) of the head portion may approximately correspond to the thickness of the first building layer. More concretely, preferably the relation $d_1/2 < d_h < 2\,d_1$ holds where $d_1$ is the thickness of the first building layer and $d_h$, the thickness of the head portion.

The distal end face of the piston element and the proximal end face of the sleeve element need not be parallel to each other but may also be inclined. In the latter case and/or if the shaft portion is longer than the sleeve element, the piston element and the sleeve element need initially (at the onset of the mechanical oscillations) not in direct contact with each other immediately adjacent the circumferential hole wall; nevertheless according to the definition used herein the interface is held to be adjacent the circumferential hole wall because in the course of the process the liquefied material will flow radially outward and into structures of the first building layer and/or along the inner surface of the first building layer.

At least one of the sleeve element and of the piston element (preferably at least the piston element especially if the shaft portion of the piston element is longer than the sleeve element) may comprise a thermoplastic material portion also at the distal end face. Due to the effect of the mechanical oscillations, such distal thermoplastic material portions may be caused to melt at the distal end face, too, and liquefied thermoplastic material portions may be caused to flow into structures of the second building layer and cause the connector to be anchored therein, too. The sleeve element in such a situation preferably surrounds the piston element at least partially closely at the distal end face, so that it prevents liquefied material of the piston element from flowing radially outward at the distal end face.

Especially, the piston element and/or the sleeve element may consist of thermoplastic material. If both the piston element and the sleeve element consist of thermoplastic material portions, they may consist of the same thermoplastic material, or of different thermoplastic materials, which preferably are weldable to each other.

If the piston element comprises a thermoplastic distal end portion, the overall length of the piston element is preferably greater than the distance between the first and second building layers plus the thickness of the first building layer, and is for example approximately equal to the thickness of the whole lightweight building element.

Also, then in an embodiment the length of the shaft portion of the piston element is greater than the length of the sleeve element, so that anchoring first starts at the distal end of the piston element and only after the piston element has been moved into the second building layer to some extent does a pressing force at the interface arise. This embodiment is favorable in—often encountered—situations where the liquefaction in contact with the second building element to set in requires a higher pressing force than the liquefaction at the interface between the piston element and the sleeve element. Thus, to the difference in length between the shaft of the piston element and the sleeve element, it is ensured that anchoring also takes place on the distal end of the connector, thus on two levels, and this is an advantage in anchoring.

Also, if the connector comprises a distal thermoplastic material portion, the pressing force pressing the piston element towards the second building layer may optionally set in prior to the mechanical oscillations to somewhat advance the thermoplastic material into the material of the second building layer, as described in U.S. Pat. No. 7,160,405 incorporated herein by reference in its entirety.

If the piston element comprises a distal thermoplastic material portion for anchoring in the second building layer, the sleeve element—whether or not it also comprises distal thermoplastic material portions—may help improving the anchoring because it prevents the liquefied thermoplastic material portions from flowing radially outward along the inner surface of the second building element.

In the embodiments where the first building layer is of wood or a wood composite or other porous or inhomogeneous material, the sleeve element's length is preferably chosen so that the interface between the proximal end face of the sleeve element and the piston element is next to the circumferential wall of the through hole when liquefaction sets in. This means that the length of the sleeve element is greater than the distance between the building layers and smaller than the distance between the building layers plus the thickness of the first building layer. The diameter of the sleeve element preferably corresponds to the diameter of the head portion of the piston element.

The sleeve element may be tube shaped and completely surround an axial section of the shaft portion. As an alternative, it may also comprise openings, slits or other structures.

The piston element and/or the sleeve element may, with the possible exception of energy directors, be symmetric with respect to a rotation around the axis, but this is not a necessity. The piston element may comprise an axial through hole or include other structural features deviating from a full rotational body in order to reduce the amount of material needed.

While, as mentioned, the piston element and the sleeve element may consist of thermoplastic material, there are applications where it is advantageous to provide a hybrid connector where at least one of the piston element and of the sleeve element comprises a mechanically stronger, for example metallic constituent. If, for example, either the sleeve element or the shaft portion or a part of either is metallic, this will enhance the resistance to impact and provide additional strength and stiffness.

In the following, the anchoring caused by the liquefied (and re-solidified) thermoplastic material portions at the (or distal of and adjacent to the) circumferential wall of the hole in the first building layer is called "first anchoring", its location is referred to as "first anchoring location". The—optional—additional anchoring caused by the liquefied (and re-solidified) thermoplastic material portions at distal end of the connector and in the second building layer is the "second anchoring", and its location is the "second anchoring location".

At least the liquefied thermoplastic material portion causing the first anchoring may further cause a connection between the piston element and the sleeve element. If both, the piston element and the sleeve element comprise thermoplastic material portions at the first anchoring location, the connection may be realized by a welding of the thermoplastic material portions to each other, which welding automatically happens by the liquefying of the thermoplastic material portions in contact with each other. If one of the piston element and the sleeve element does not comprise thermoplastic material at the first anchoring location (or thermoplastic material with a substantially higher melting point than the thermoplastic material of the other respective element), it may alternatively comprise structures, such as a thread or a plurality of ridges or other undercut structures, that may cause a positive-fit connection of the liquefied and re-solidified thermoplastic material portions and the non-liquefied material at the interface.

Further, if available, optionally also the liquefied thermoplastic material portion causing the second anchoring may cause a welding and/or positive-fit connection between the piston element and the sleeve element.

The piston element and/or the sleeve element may comprise an energy director, either at the interface for the first anchoring or at the distal end face, or both. Such energy directors may be structural energy directors, such as at least one of a reduction of a cross section as a function of the position along the axis, towards the interface where liquefaction is desired, at least one protrusion within a broad ranges of diameters, the protrusion being at the interface where liquefaction is desired, Energy directors may, however, in addition or as an alternative, also be due to material properties. They thus may comprise:

an inhomogeneous material distribution over the anchoring element (and/or the second and/or the third element), so that the material adjacent the interface where liquefaction is desired has a higher absorption for mechanical vibration energy than material adjacent an other interface (for example the opposite interface). For example the anchoring element may comprise two parts adhering to each other, the part adjacent the interface to the third element being softer than the part adjacent the interface to the second element (or vice versa). As an other example, the anchoring element may comprise a softener with a concentration gradient over the anchoring element's length, etc.

The connector may—this pertains to all embodiments—be suitable for attaching an other object to the lightweight building element (thus serve as 'dowel' or anchoring base) and/or for providing mechanical stability between the building layers. For the purpose of attaching an other element, the connector may comprise further structures not described in any further detail herein, for example a thread, retaining structures for clamping or another positive-fit connection, etc; such means for attaching another element as such are known in the art and not described any further here.

During the anchoring process, the distance between the building layers may be defined by the interlining (if present) or by other means arranged between the building layers. In addition or as an alternative, the distance between the building layers may be defined by an external holding means, such as a holding frame or the like, and it may be fixed or further consolidated by the connector.

For manufacturing the connector, methods that are as such known in the art may be used. For example, if the connector is entirely made of thermoplastic material, it may be manufactured by injection molding. The two-part connector as described and illustrated in the present application is also suitable for being manufactured with a single mold for two parts. This is especially advantageous for economical reasons. According to a special embodiment, therefore, a method of manufacturing a connector includes providing a single mold incorporating a negative replica of both the piston element and the sleeve element, connected by a bridge portion (that constitutes a predetermined breaking location), and of injection molding the connector by injecting a thermoplastic material into the mold. The final step of—after cooling the thermoplastic material—breaking the bridge to separate the piston element and the sleeve element may be done in factory or may be done by the user during the anchoring process, i.e. the connector in the step of inserting until a distal portion rests against the second building layer then still may comprise the bridge. The property of the sleeve element and the piston element being movable in axial direction relative to one another then, of course, is to be understood to be a property "after the bridge has broken".

BRIEF DESCRIPTION OF THE DRAWINGS

In the following, embodiments of the invention are described referring to drawings. The drawings are schematic and not to scale. In the drawings, same numerals refer to same or corresponding elements. The drawings show.

DESCRIPTION OF THE PREFERRED EMBODIMENTS

Figure 1A:
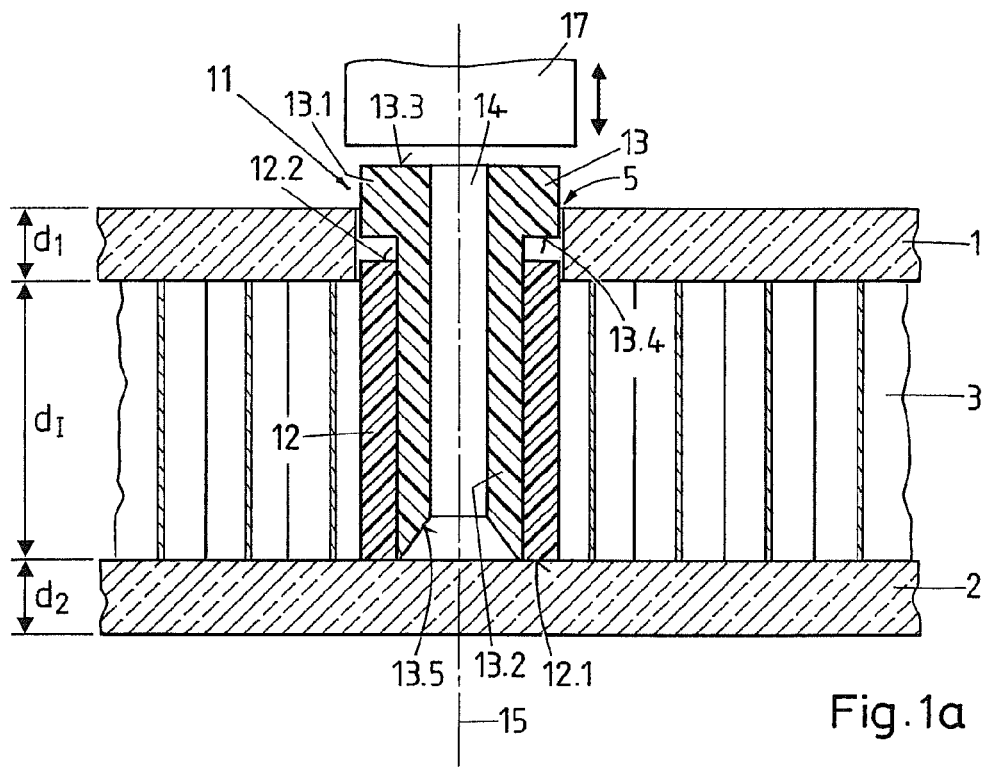
FIGS. 1a and 1b show a first example of a connector placed in a lightweight building element and anchored therein, respectively.

The lightweight building board of FIG. 1a comprises a first building layer 1, a second building layer 2, and an interlining 3 between the first and second building layer. The first and second building layers may be of identical or of different material compositions. They may, for example, be of a wood based material, such as a wood composite material like a fiberboard (particle board, medium-density fiberboard, or hardboard) or the like. The building layer thicknesses $d_1$, $d_2$ of the two building layers may be equal or different and may, for example, be between 1 mm and 15 mm, especially between 2 mm and 10 mm. The distance $d_I$ of the building layers may be chosen within a large range, depending on the needs. Often it is between 20 mm and 50 mm, however, other distances are not excluded, since the distance $d_1$ for most embodiments of the invention is not a critical number.

The interlining 3 may, for example, be a honeycomb-like structure of cardboard, or alternatively a light insulation material such as a foamed material or cellular plastics, or a framework structure with spaces etc. In general, the interlining 3 may have the function of affixing the building layers 1, 2 to each other, defining the distance between them, insulating, it may have the function to take up shearing forces and/or other functions as such known in the art. During the anchoring process described in the following, the interlining 3 may have the function of fixing the distance between the building layers 1, 2, and/or taking up shearing forces but otherwise does not play any decisive role. If the distance between the building layer is fixed by other means—such as a temporary holder—the interlayer may be optional, and the anchoring method described hereinafter may be suitable for affixing the first and second building layers to each other.

The first building layer 1 is provided with a through hole 5 into which the connector 11 is inserted.

The connector 11 comprises a sleeve element 12 and a piston element 13. The piston element in the depicted embodiment has an axial through hole 14, i.e. it is hollow. The piston element comprises a shaft portion 13.1 and a head portion 13.2. Because the head portion radially extends beyond the shaft portion, it forms a distal head end face 13.4 facing towards the proximal end face 12.2 of the sleeve element.

In the depicted embodiment, the piston element and the sleeve element are essentially rotationally symmetrical with respect to a rotation around the axis 15. Such a symmetry, at least of an outer contour of the connector, is especially advantageous since the connector then is suitable for being inserted in a round through hole 5 that is easy to manufacture with standard tools. However, the rotational symmetry is not a necessity because it is not required in the anchoring process. For example elliptical outer contours or outer contours being flat in section are also feasible. In fact, any shape extended in one (longitudinal) direction is possible.

The shaft portion preferably has an axial extension (length) that is greater than the length of the sleeve element, so that when both the distal end face of the shaft portion and the distal end face 12.1 of the sleeve rest against the inner surface of the second building layer, there is a gap 16 between the proximal end face of the sleeve element 12 and the distal end face of the head portion 13.2 if both, the sleeve element 12 and the piston element 13 abut the inner surface of the second building layer 2.

The shaft portion preferably has an axial extension (length) that is greater than the length of the sleeve element, so that when both the distal end face of the shaft portion and of the sleeve rest against the inner surface of the second building layer, there is a gap 16 between the proximal end face of the sleeve element 12 and the distal end face of the head portion 13.2 if both, the sleeve element 12 and the piston element 13 abut the inner surface of the second building layer 2.

Further, the thickness (axial extension) of the head portion approximately corresponds to the thickness of the first building layer, the length of the entire piston element is approximately equal to the thickness of the lightweight building element, the length of the sleeve element is greater than (or at least approximately equal to) the spacing between the building layers—and thus the thickness of the interlining 3.

The piston element distally is tapered towards the distal end face 13.5. In the depicted embodiment, the taper is formed by a gradual widening of the through hole 14 towards the distal side. This is advantageous since it allows the piston element to be in contact with and closely surrounded by the sleeve element at the interface to the second building layer. However, in addition or as an alternative it would also be possible to shape the piston to be tapered in the sense that its outer diameter gradually becomes smaller towards the distal end face. Alternatively to the taper, the piston element may not be tapered at all, or it may comprise other kinds of energy directors, such as a ridge, etc.

The axial through hole 14 of the piston element is optional. If the axial through hole is not present, the piston element may nevertheless comprise at least one energy director towards the distal end face, by for example comprising a shape that in cross section is dovetail like.

Both, the piston element and the sleeve element in the depicted embodiment consist of thermoplastic material. Suitable materials for the thermoplastic parts of the connector in all embodiments include for example a plastics like polyamide, a polycarbonate or a polyester carbonate, or also an acrylonitrile butadiene styrene (ABS), An Acrylester-Styrol-Acrylnitril (ASA), Styrene-acrylonitrile, poly-methyl-methacrylate, polyvinyl chloride, polyethylene, polypropylene, and polystyrene, or copolymers or mixtures of these. In addition to the thermoplastic polymer, the material may also comprise a suitable filler, for example reinforcing fibers, such as glass and carbon fibers. In general, all materials with a sufficiently high solidity and sufficiently high modulus of elasticity of for example at least 0.5 GPa, that by means of ultrasound may be locally liquefied. In general, these materials are the ones that are also suitable for ultrasonic welding. An example of an especially suitable material is ABS.

The piston element and the sleeve element may generally be of an identical material, or they may be of different materials. If they are of different materials, the materials should preferably be ultrasonically weldable to each other. An example of a suitable combination of different material is to provide the piston element with a reinforcement, for example a fiber reinforcement, and to provide the sleeve element with a different enforcement or with no enforcement at all, while the matrix materials are identical. A fiber reinforcement of the piston element enhances the shock resistance, while keeping the sleeve element flexible enhances the tenacity of the anchoring.

The process of anchoring the connector of FIG. 1a includes pressing an oscillating sonotrode 17 against the proximal end face 13.3 of the piston element. In contrast to the depicted embodiment, the sonotrode can comprise a protruding tenon (or other shape) to guide the piston element. The proximal end face of the piston element serves as coupling-in surface; this holds for all embodiments shown in the figures. In all embodiments, the oscillations may be ultrasonic vibrations. Generally, oscillations in the frequency range between 2 kHz and 100 kHz, preferably between 10 kHz and 40 kHz, for example around 20 kHz; other frequencies are not excluded. The power of the apparatus generating the oscillations—it may be an apparatus available on the market—depends on the dimensions chosen, it can be in the range between 100 W and 4 kW.

In addition or as an alternative to the plane coupling faces, the coupling may also be done by more sophisticated structures, as partly illustrated in the following referring to guiding structures. Also, while the herein described embodiments all relate to an axially vibrating sonotrode, this is not a necessity either. Rather, in addition or as an alternative to such oscillations, also torsional oscillations and/or rotational movements may be envisaged.

The force by which the piston element is pushed towards the distal side may optionally be applied already before the mechanical oscillations set in, in order to press the distal end of the connector slightly into the surface of the second building layer. When the oscillations start, this will ease the guiding and ensure an optimized feeding of the mechanical oscillations into the piston element.

Figure 1B:
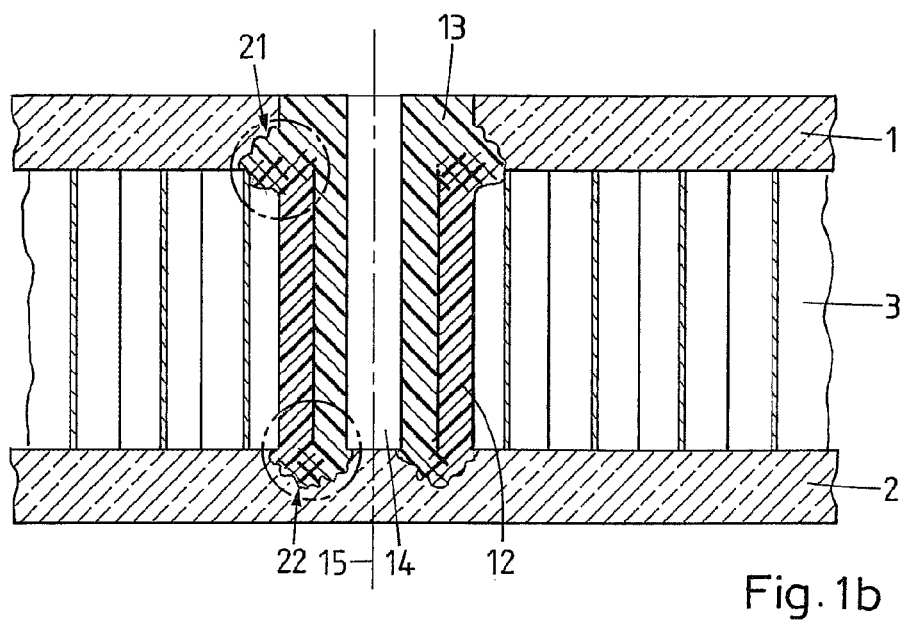

As soon as the mechanical oscillations are coupled into the piston element, mechanical energy will be absorbed, especially in the region of the distal end face, and by this the liquefaction of the thermoplastic material at the distal end face 13.5 will commence. Due to the pressing force applied simultaneously, and especially due to the guidance by the sleeve element, the liquefied material will be caused to penetrate into the second building layer, to create a second anchoring location 22 (FIG. 1b).

Because of the forward movement, under the pressing force and because of the distal liquefaction of the thermoplastic material and penetration of the second building layer thereof, the head distal end face 13.4 will soon be in contact with the proximal end face 12.2 of the sleeve element 2. This will initiate absorption of mechanical energy and liquefaction at this interface, too. If, as in the illustrated embodiment, the sleeve element and the piston element are both of thermoplastic material with approximately equal melting points, material portions of both elements will be liquefied. The liquefied material will evade the pressing force by flowing radially outward and into structures of the first building layer and/or along the inner surface of the first building layer into (initially empty or filled) space between the building layers, as illustrated in the first anchoring location 21 in FIG. 1b. In addition, at the first anchoring location a welding of the piston element to the sleeve element will take place. Depending on the operation parameters, in the process mechanical oscillations may be caused to also be coupled, to some extent, into the sleeve element and to cause some liquefaction at the distal end face of the sleeve element, too, as shown in FIG. 1b.

The forward movement of the piston element during the anchoring process—thus the effective reduction of its length—depends on the materials involved and may be between 1 mm and 5 mm, for example 2-4 mm.

Structures which are penetrated by the liquefied thermoplastic material may include pre-existing structures of the material, such as spaces between wood chips at the circumferential hole wall. In addition or as an alternative, the structures may be generated by the pressure of the liquefied thermoplastic material in interaction with inhomogeneities of the according material. The principle of interpenetration of structures of diverse materials, including wood and wood composites, by thermoplastic material liquefied by the effect of ultrasonic vibration is described for example in U.S. Pat. No. 6,913,666, U.S. Pat. No. 7,160,405, US 2008/0 047 107, WO 2008/034 278, or the unpublished application U.S. 60/982, 449, all of which are incorporated herein by reference in their entirety.

Figure 2:
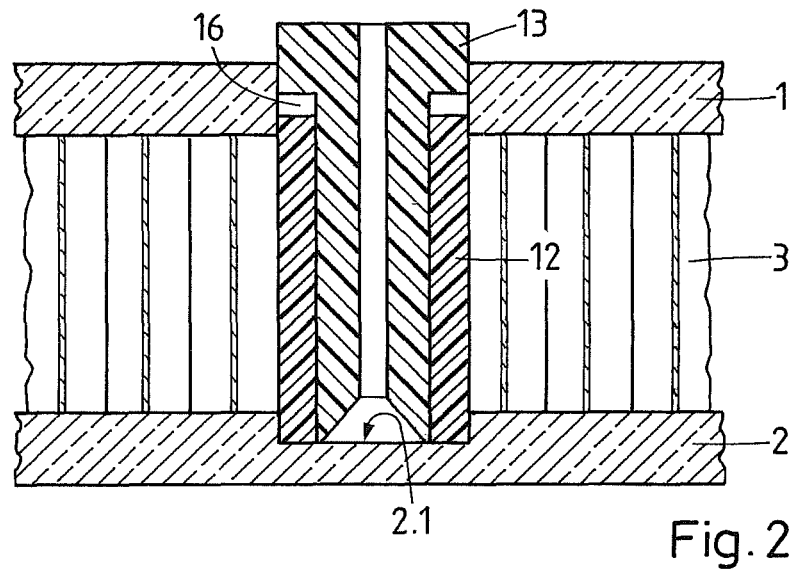
FIGS. 2 and 3 depict variants of the configuration of FIG. 1a, where the second building layer is bored into.

The variant shown in FIG. 2 is distinct from the embodiment of FIG. 1 in that the second building layer 2 is pre-drilled, i.e. comprises a (shallow) blind hole 2.1. The blind hole 2.1 may for example be manufactured by the same drill or mill that also creates the through hole 5, in the same manufacturing step. It ensures that the surface for the second anchoring is clean, especially in cases where the inner surface of the second building layer is initially coated, for example by a glue or a lacquer or the like. Further, the pre-drilling improves the guiding of the connector during the anchoring process and ensures a deeper anchoring.

Figure 3:
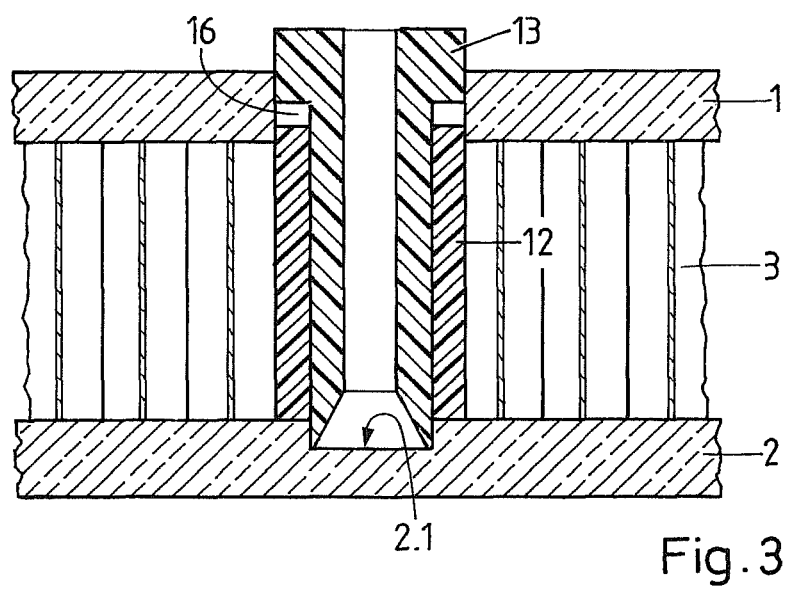

The variant of FIG. 3 also includes pre-drilling. However, the blind hole 2.1 has the diameter of the shaft portion, and instead of the sleeve element 12 (as in FIG. 2), the piston element 13 is guided by it during anchoring. The variant of the Figure necessitates a different tool for the blind hole 2.1 than for the through hole 4 (or a stepped tool), however, it features the additional advantage that the second anchoring includes anchoring on two levels.

In the variant of FIG. 3, the above-described optional relationship between the length of the shaft portion and the length of the sleeve element is to be modified in that the length of the sleeve element plus the depth of the shallow blind hole is preferably less then the length of the shaft portion.

The blind hole 2.1 may (this holds also for the configuration of FIG. 2) optionally also be provided with a special structure such as a thread portion to enhance the anchoring action also for weak interpenentration of the building layer material by the thermoplastic material.

Arrangements as in FIG. 2 or 3 may be an option also for the connectors of the types described hereinafter, especially including, for a blind hole as shown in FIG. 2, the configuration of FIGS. 13a/13b (anchoring in a lightweight building element with building layers not suitable for interpenetration by liquefied thermoplastic material), where the guidance of the connector provided by the blind hole may also be advantageous.

Figure 4:
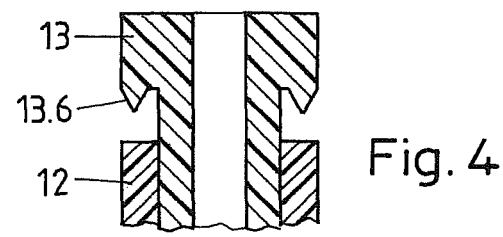
FIGS. 4-12 show alternative embodiments of connectors or of piston elements or sleeve elements thereof.

Although not illustrated in FIGS. 1a-3, either the piston element or the sleeve element or both may include energy directors at the interface between the distal head portion end face and the proximal end face of the sleeve element. FIG. 4 illustrates the head portion to comprise a ridge 13.6, such ridge being but one of many embodiments of energy directors, as the person, for example, skilled in the art of ultrasonic welding will know.

Figure 5:
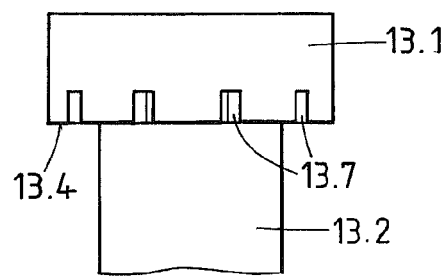
Figure 6:
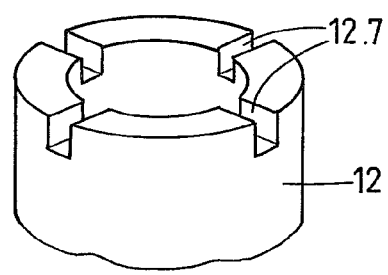

FIGS. 5 and 6 show, as alternatives or in addition to the energy director type of FIG. 4, the head portion 13.1 and the proximal end face of the sleeve element, respectively, to comprise a plurality of notches 13.7; 12.7. Such a crown-like structure has the effect of easing melting at the interface. A crown-like structure may in an addition or as an alternative optionally also be present at the distal end face of the piston element and/or of the sleeve element.

Figure 7:
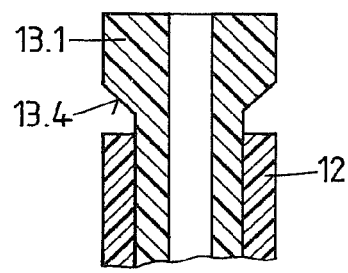

In the variant depicted in FIG. 7, the piston element at the distal end face of the head portion is tapered outwardly, so that when in the anchoring process it is pressed against the sleeve element, a lateral outward pressure acts on the proximal end portion of the sleeve element and on the liquefied material. FIG. 7, therefore, depicts an example of a not horizontal interface between the head portion distal end face and the sleeve element proximal end face.

Figure 8:
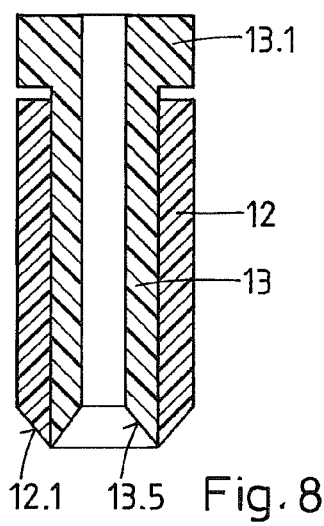

The embodiment of the connector of FIG. 8 differs from the one of FIG. 1a in that not only the piston element 13 but also the sleeve element 12 comprises an energy director at the distal end face. More concretely, the sleeve element of the depicted embodiment tapers, on the distal end, towards the piston element.

Figure 9:
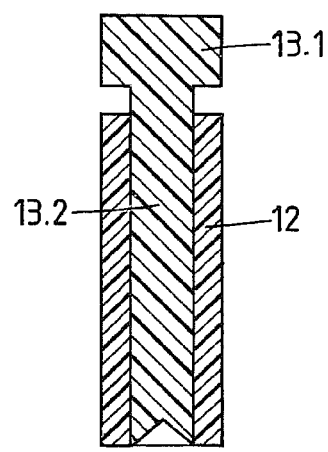

In the embodiment of FIG. 9, the piston element 14 does not have the axial through hole but is a piston shaped solid body. At the distal end face, it comprises an energy director, namely it is dovetail shaped in cross section. The embodiment of FIG. 9 is especially suited for being dimensioned with a small diameter, for example for space saving arrangements or if a large diameter through hole in the first building layer is, for some reason, not desired.

Figure 10:
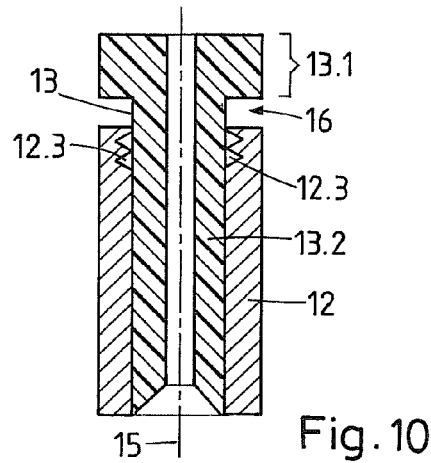

FIGS. 10-13b deal with variants of the connector that are not entirely made of a thermoplastic material. The sleeve element 12 of the connector of FIG. 10 is of a material that is not liquefiable by the mechanical vibrations that act to liquefy thermoplastic material of the piston element. More concretely, the sleeve element 12 in the depicted embodiment is metallic, for example of Aluminum or steel. Close to the proximal end face it comprises structures 12.3 that are suitable for building, together with liquefied and re-solidified thermoplastic material of the piston element, a positive-fit connection that secures the piston element and the sleeve element against each other.

The working principle of the embodiment of FIG. 10 may be, depending on the chosen configuration of the lightweight building element, similar to the one described referring to FIGS. 1a and 1b, namely thermoplastic material of the piston element liquefied by the absorption of mechanical vibration energy penetrates material of the first and second building layer at a first and a second anchoring location, respectively, and/or at the first anchoring location thermoplastic material is pressed radially outward to flow along the inner surface of the first building layer and to thereby act in a blind rivet kind.

If the building layers are of thermoplastic material or comprise thermoplastic material, in addition or as an alternative the process may be similar to the one depicted in FIGS. 1a and 1b, with the difference that the affixing is a welding between the layers and the connector—if the thermoplastic material of the connector and the layers are chosen so that they are weldable.

Figure 11:
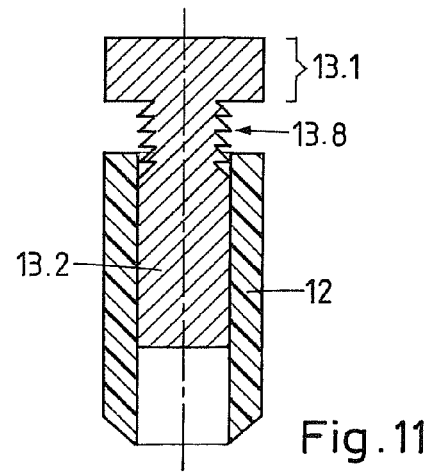

The embodiment of FIG. 11, in contrast, comprises a piston element 13 of a material that is not liquefiable by the mechanical vibrations that act to liquefy thermoplastic material of the sleeve element 12, namely a metal such as aluminum or steel in the depicted embodiment. The piston element in vicinity of the interface of the head portion 13.1 and the proximal end face of the sleeve element 12 comprises structures 13.8 that are suitable of building a positive-fit connection with liquefied and re-solidified thermoplastic material portions of the sleeve element. In the embodiment of FIG. 11, the shaft of the piston element is substantially shorter than the sleeve element 12 so that an axial movement of the piston element during the anchoring is possible without the distal end face of the piston element abutting against the surface of the second building layer. Also in the embodiment of FIG. 11, liquefaction takes place both, in the vicinity of the peripheral wall of the through hole in the first building layer and at the surface of the second building layer.

In addition or as an alternative to the structures 13.8 illustrated to be arranged proximally on the piston element, the piston element may also comprise more distal structures (not shown), especially if the piston element's shaft is long enough to reach the surface of the second building layer at the end of the anchoring process. Of course, the structures may also be distributed on the entire length of the shaft; for example the shaft may comprise a thread reaching from the distal side up to the head portion.

Figure 12:
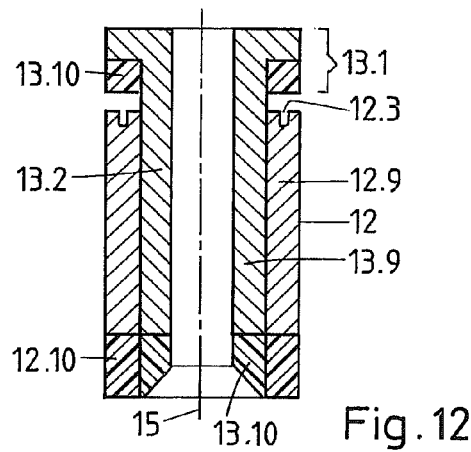

FIG. 12 depicts an example of a connector where the piston element 13 and/or the sleeve element 12 is/are hybrid metal/thermoplastic elements. In FIG. 12, both, the piston element 13 and the sleeve element 12 comprise metallic portions 13.9/12.9 and thermoplastic portions 13.10/12.10 rigidly attached (for example by a not shown positive-fit connection, an adhesive or other means) to the metallic portions. Many configurations are feasible, a condition being that at the first anchoring location and preferably also at the second anchoring location at least one of the piston element and of the sleeve element comprises thermoplastic material.

Figure 13A:
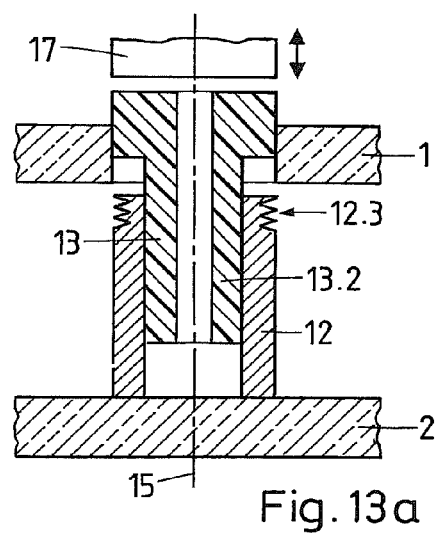
FIGS. 13a and 13b depict a configuration with metallic building layers.
Figure 13B:
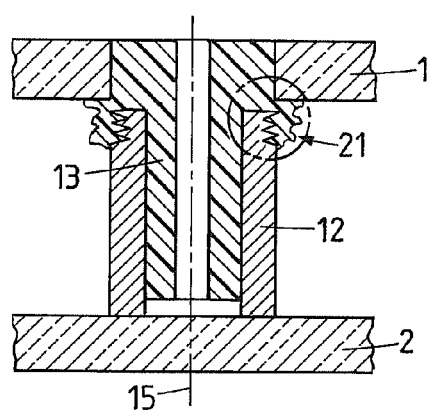

Referring to FIGS. 13a and 13b, a method of anchoring a connector in a lightweight building element comprising building layers 1, 2 of material lacking structures that can be penetrated by liquefied thermoplastic material is illustrated. In the shown embodiment, both building layers 1, 2 are of a metal, for example thin-sheet aluminum. An interlining—such as a foam—may be present between the building layers, although the figures do not show such an—optional—interlining. In contrast to the previously described embodiments (except the one shown in FIG. 11), the length of the shaft portion 13.2 is smaller than the distance of the building layers. In the anchoring process, like in the other embodiments, the piston element 13 is subject to a pressing force and mechanical oscillations by a sonotrode 17. The sleeve element rests against the second building layer, and thermoplastic material portions liquefy at the interface between the head portion distal end face and the proximal end face of the sleeve element. The liquefied thermoplastic material, as depicted in FIG. 13a, flows radially outward along the inner surface of the first building layer and blocks the connector, in a blind rivet fashion, against being drawn out. Optional structures 12.3 are arranged at the metallic sleeve element's outer surface to enhance the intimacy of the connection after the anchoring process.

The variant of the anchoring process shown in FIGS. 13a and 13b may, of course, also be applied with a thermoplastic sleeve element and/or a metallic piston element and/or with at least one of the piston element and of the sleeve element being hybrid liquefiable/non-liquefiable elements. Especially, the connector of FIGS. 13a and 13b could also be entirely of a thermoplastic material.

The structures 12.3 in the sleeve element are advantageous for providing an improved connection between the sleeve element and the piston element, however, they are not a necessity because the blind rivet effect also secures the sleeve element against displacement.

Also the embodiment of FIGS. 13a and 13b may, in analogy of the configuration of FIG. 3, be anchored in a lightweight building element where the second building layer 2 comprises a blind hole. Then, the shaft portion of the piston element may be longer than the sleeve element length, and a liquefaction of distally arranged thermoplastic material may take place in contact with the second building layer. The blind hole, in this configuration, further comprises a thread or other undercut structure, so that an anchoring takes place by the liquefied and re-solidified thermoplastic material.

In addition or as an alternative, the first building 1 layer may be provided with a thread or other retaining structure along the circumferential wall of the through hole to enhance anchoring.

In an example, the following combination of characteristics is provided:
- the first building layer comprises a thread (or similar structure constituting an undercut);
- the second building layer comprises a blind hole with a diameter approximately corresponding to the diameter of the shaft portion of the piston element, and the blind hole comprises a comprises a thread (or similar structure constituting an undercut);
- The piston is of a thermoplastic material, at least where in contact with the two building layers;
- The sleeve element has a length that corresponds to the distance between the building layers;

The shaft portion of the piston element is longer than the sleeve element.

Then, in the anchoring process first thermoplastic material of the piston element will liquefy distally, and flow into the thread (or other) structure of the blind hole. Then, the head portion will start bearing on the sleeve, and thermoplastic material will liquefy at the according interface. It will flow back along the thread and connect the head of the piston element with the first building layer.

Figure 14:
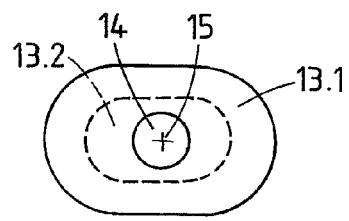
FIGS. 14-16 shows top views of not rotationally symmetrical piston elements.

While the connectors of the previously described embodiments, with the possible exception of symmetry breaking notches, crown like structure or other energy directors, generally are essentially rotationally symmetric with respect to rotations around the axis 15, this is by no means a necessity. Only by way of example FIG. 14 depicts a top view of an alternative head portion 13.1 of a piston element 13 of a non-rotational connector. While the (optional) through hole 14 in the depicted embodiment is cylindrical, this is not the case for the shaft portion 13.2, and thus not for the sleeve element (not shown) either. More in general, the concepts described herein are suitable for almost any cross sectional shape of the connector, as long as the shape of the head portion is approximately adapted to the shape of the through hole 5 in the first building layer or vice versa.

Such not rotationally symmetrical layouts are feasible for the principles of all previously described embodiments, thus all of FIGS. 1a-13b may equally well relate to not rotationally symmetrical connector layouts.

Figure 15:
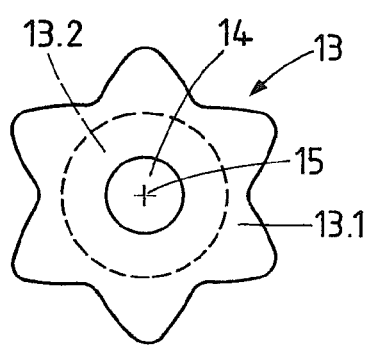
Figure 16:
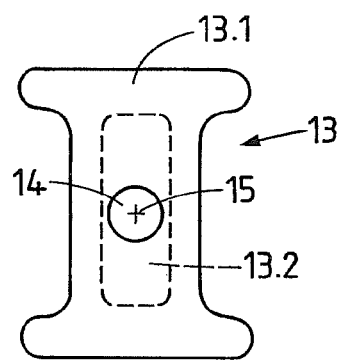

FIG. 15 shows a variant with a star-shaped connector with a plurality of radially protruding wings. In the depicted variant, the shaft portion 13.2 is cylindrical but may alternatively also be star-shaped. Such embodiments with a large outer surface for a given outer diameter are advantageous if a high load bearing material amounts and thus in terms of resistance against pulling forces—and also in terms of resistance against torsional forces. Other shapes include 'torx'-like geometries, rectangular or pentagonal, hexagonal, triagonal, . . . geometries, or, for example T-bar geometries as illustrated in FIG. 16. Rectangular or T-bar (or double T) geometries are especially advantageous in terms of strength against bending forces.

Figure 17:
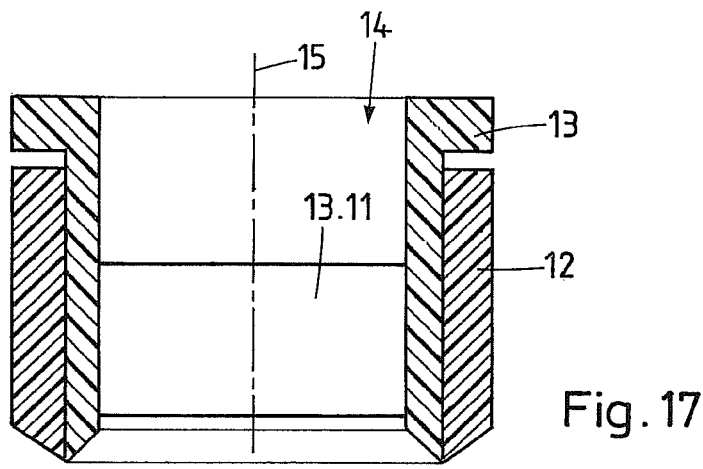
FIGS. 17-20 show further alternative embodiments of connectors.

FIG. 17 illustrates a connector that consists of the thermoplastic material and may be anchored, similar to the connector of FIG. 1a, at two anchoring locations, by the interpenetration of structures of the building layer(s) and/or in a blind rivet fashion and/or by welding to thermoplastic material of the building layer(s). In contrast to the embodiments illustrated in the previous figures, however, the diameter of the connector is comparably large, and for example larger than its axial extension. A connector of the kind illustrated in FIG. 17 may, for example, serve for accommodating a larger element to be anchored in the lightweight building element, such as a concealed hinge. To that end, the piston element may comprise, for example on the inside of an axial hole 14, corresponding structures (not shown in FIG. 17) that may also deviate from a rotational symmetry. In the depicted embodiment, the piston element in addition comprises schematically illustrated, optional bridges 13.11 enhancing the mechanical stability. Such bridges or web-like structures or the like in the through hole 14 (if present) also constitute deviations from a rotationally symmetric set-up and may be present in any embodiment where desired for stability or manufacturing reasons.

Figure 18:
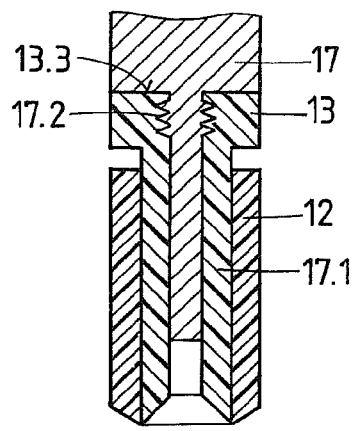

While in FIGS. 1a and 13a, the contact between the sonotrode 17 and the piston element was illustrated to be a plane only, this need not be the case. Especially for applications involving manual steps it may be desirable to foresee a guiding function of the sonotrode as well. The sonotrode 17 depicted in FIG. 18 comprises a guiding pin protruding from the coupling surface that is in contact with the proximal end face 13.3 of the piston element. Such a guiding pin 17.1 may ease inserting of the connector and provide mechanical stability during the anchoring process, especially if the material strength of the connector is such that a collapsing of the connector during the anchoring would happen absent the pin. In such configurations, the guiding pin may support the piston element from within, for example over a large fraction of the length of the latter. It has further been found that in some configurations such a guiding pin may help to stabilize the entire process and to diminish the energy required.

In the depicted embodiment, the guiding pin further comprises retaining structures 17.2 for holding the connector. If such retaining structures are present and/or if the guiding structure of the sonotrode tightly fits into a corresponding structure (through hole 14 in the depicted embodiment) of the piston element, the connector may be mounted on the sonotrode before being placed in the lightweight building element.

Figure 19:
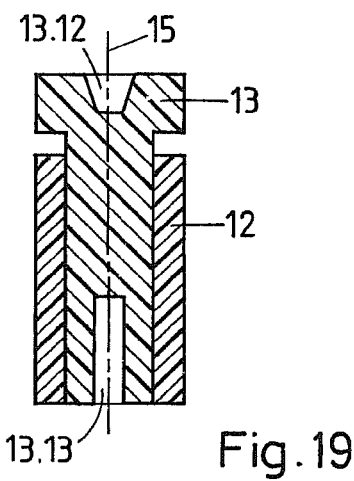

FIG. 19 depicts an embodiment where structure for receiving a guiding pin (or guiding tenon; in general any guiding structure may be used) is not formed by an axial through hole in the piston element 13 but by a proximal blind hole 13.12. In addition, also a distal blind hole 13.13 is illustrated, with an effect to distally weaken the piston element in order to ease melting of thermoplastic material there—similar to the dovetail structure of FIG. 9. In general, the through hole depicted in most of the previous embodiments is by no means a necessity but, in addition to the functions also achieved by the blind holes 13.12, 13.3 and/or to potentially serving for anchoring a further element therein, merely has the function of somewhat reducing the amount of material used; depending on the application this may not be desired in all situations, so that embodiments lacking the axial through hole may be a good alternative to the above-depicted embodiments comprising the through hole 14.

Figure 20:
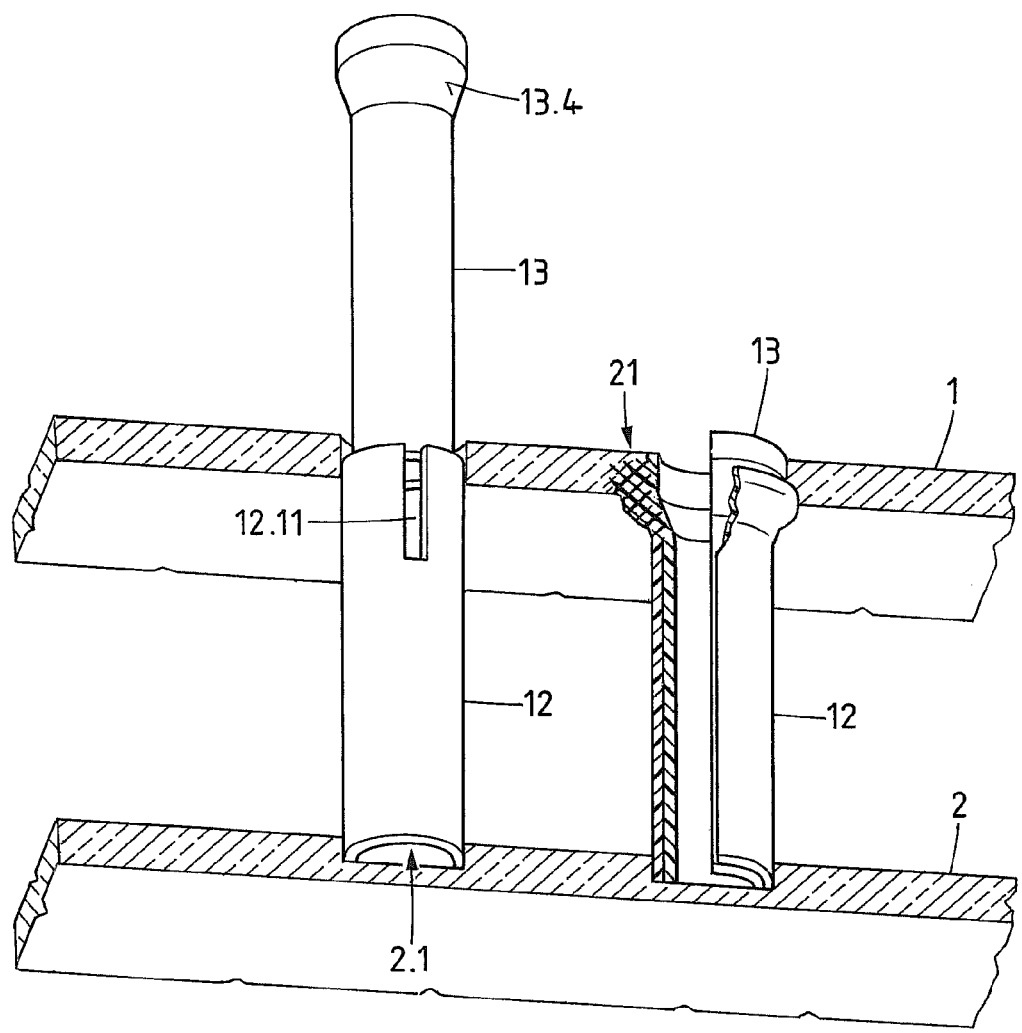

In the embodiments of FIGS. 1a/1b, 2, 3, 8, 9-13, 17-19, piston element is formed so that a head distal end face 13.4 of the piston element is approximately horizontal and forms a shoulder. An example of a non-horizontal, tapered distal end face of the piston element is shown in FIG. 7. Yet another example of a tapered bit between the shaft portion and the head portion is shown in FIG. 20. FIG. 20 shows, on the left, a connector prior to the anchoring process and on the right, schematically, and partially in section, the connector during the anchoring process (the sonotrode is not shown in FIG. 20). The taper of the head portion is comparably long, extending almost to the proximal end face of the piston element (it would be possible to make the tapered bit extend to the very proximal end of the piston element). The sleeve element 12 comprises at least one proximal, axially-extending slit 12.11 that allows the proximal end of the sleeve portion to be radially deflected to give way to the outward pressure coming from the tapered portion being subject to an axial pressing force. By this, the effect of outward pressing during the anchoring process is enhanced. The connector shown on the right has a substantial material portion that has been deflected radially outward and along the inner surface of the first building layer 1.

What is claimed is:

1. A method of anchoring in a connector a lightweight building element, the lightweight building element including a first building layer and a second building layer arranged at a distance from the first building layer, the method comprising the steps of:

providing a connector that comprises a sleeve element and a piston element, the piston element comprising a shaft portion and being movable in an axial direction relative to the sleeve element, while the sleeve element at least partially surrounds the shaft portion, wherein at least one of the sleeve element and of the piston element comprises a thermoplastic material;

providing a through hole in the first building layer, the through hole comprising a circumferential wall;

inserting the connector until a distal portion thereof rests against the second building layer, the second building layer arranged at a distance from the first building layer;

coupling mechanical oscillations into the piston element while pressing the piston element towards the distal side, and thereby liquefying at least a portion of the thermoplastic material at an interface portion between the sleeve element and the piston element while the interface portion is adjacent the circumferential wall or distal with respect to it, thereby generating a liquefied thermoplastic material portion, and causing liquefied thermoplastic material of the liquefied thermoplastic material portion to flow radially outward and into structures of the first building layer and/or along an interior surface of the first building layer; and letting the liquefied thermoplastic material portion re-solidify to form a positive-fit connection with the first building layer, wherein at least one of the following conditions is fulfilled:
the piston element reaches to a distal end of the connector, a distal end of the piston element resting against the second building layer after the step of inserting the connector is completed, and the distal end of the piston element comprises thermoplastic material portions which are at least partially liquefied by the step of coupling mechanical oscillations into the piston element while pressing;

during a stage of the step of coupling mechanical oscillations into the piston element, the sleeve element is supported by the second building layer, and the piston element is supported by the sleeve element without direct contact with the second building layer.

2. The method according to claim 1, wherein the thermoplastic material of the piston element and/or of the sleeve element includes a distal thermoplastic material portion at a distal end of the piston element and/or the sleeve element, respectively, and wherein in the step of coupling mechanical oscillations into the piston element while pressing the piston element towards the distal side, at least a part of the distal thermoplastic material portion is liquefied due to the effect of the mechanical oscillations and is pressed into structures of the second building layer to form, after re-solidification, a positive-fit connection with the second building layer.

3. The method according to claim 2, wherein at least the piston element comprises a distal thermoplastic material portion and wherein an axial extension of the piston element is greater than the distance between the first and second building layers plus a thickness of the first building layer.

4. The method according to claim 2, wherein an axial extension of the shaft portion is greater than an axial extension of the sleeve element.

5. The method according to claim 1, further comprising the step of providing, prior to the step of inserting the connector, a blind hole in the second building layer, and wherein the step of inserting the connector includes inserting the connector until a distal portion thereof rests against a base of the blind hole in the second building layer.

6. The method according to claim 1, wherein both the sleeve element and the piston element each comprise thermoplastic material, wherein the step of coupling mechanical oscillations into the piston element while pressing the piston element towards the distal side causes thermoplastic material portions of both, the piston element and the sleeve element to melt, and wherein the step of letting the liquefied thermoplastic material portions generates a weld between the piston element and the sleeve element.

7. The method according to claim 1, wherein at least one of the sleeve element and the piston element comprises a material not liquefiable by mechanical oscillations, and comprises structures suitable for forming a positive-fit connection in the not liquefiable material, and wherein the step of coupling mechanical oscillations into the piston element while pressing the piston element towards the distal side causes thermoplastic material portions to flow into these structures.

8. The method according to claim 1, wherein the piston element comprises a head portion with an outer contour essentially corresponding to a cross section of the through hole.

9. The method according to claim 8 wherein an outer contour of the sleeve element essentially corresponds to the cross section of the through hole in the first building layer.

10. The method according to claim 1, wherein regarding an axial extension $I_S$, of the sleeve element, the relation $d_f-d_1/2<I_S<d_f+d_1$ holds, where $d_f$ is the distance between the first and second building layers, and $d_1$ is a thickness of the first building layer.

11. A connector for being anchored in a lightweight building element, the lightweight building element comprising a first building layer and a second building layer arranged at a distance from the first building layer, the connector comprising:

a sleeve element and a piston element;

wherein the piston element comprises a head portion and a shaft portion and is movable in an axial direction relative to the sleeve element while the sleeve element at least partially surrounds the shaft portion;

wherein the piston element further has a coupling-in surface not parallel to the axial direction, the coupling-in surface being for coupling in mechanical oscillations into the piston element;

wherein at least the piston element comprises thermoplastic material, a portion of the thermoplastic material being liquefiable, at an interface between the piston element and the sleeve element, which interface is not parallel to the axial direction, by mechanical oscillations coupled into the piston element via the coupling-in surface while the piston element and the sleeve element are pressed against each other in an axial direction.

12. The connector according to claim 11, wherein the piston element and the sleeve element both consist of thermoplastic material.

13. The connector according to claim 11, wherein at least one of the piston element and the sleeve element comprises a metallic portion.

14. The connector according to claim 11, wherein at least one of the piston element and the sleeve element comprises an energy director that is either arranged at a portion comprising thermoplastic material or is arranged at a portion comprising no thermoplastic material, wherein that portion forms an interface with thermoplastic material when the sleeve element and the piston element are pressed against each other.

15. The connector according to claim 11, wherein the head portion of the piston element is tapered towards the distal side and wherein the sleeve element has a slit extending distally from the proximal end.

16. The connector according to claim 11, wherein the sleeve element comprises a portion that is not thermoplastic.

17. The connector according to claim 16, wherein the sleeve element consists of material that is not thermoplastic.

18. A connector for being anchored in a lightweight building element, the lightweight building element comprising a first building layer and a second building layer arranged at a distance from the first building layer, the connector comprising:
 a sleeve element and a piston element;
 wherein the piston element comprises a head portion and a shaft portion and is movable in an axial direction relative to the sleeve element while the sleeve element at least partially surrounds the shaft portion;
 wherein the piston element further has a coupling-in-surface not parallel to the axial direction, the coupling-in surface being for coupling in mechanical oscillations into the piston element;
 wherein at least the sleeve element comprises thermoplastic material, a portion of the thermoplastic material being liquefiable, at an interface between the piston element and the sleeve element, which interface is not parallel to the axial direction, by mechanical oscillations coupled into the piston element via the coupling-in surface while the piston element and the sleeve element are pressed against each other in an axial direction; and
 wherein the sleeve element comprises, in addition to the thermoplastic material, a not thermoplastic constituent, wherein the sleeve element either comprises the thermoplastic material at the interface or the piston element comprises thermoplastic material at the interface.

19. The connector according to claim 18, wherein the sleeve element comprises the thermoplastic material at a proximal end thereof, and wherein the proximal end of the sleeve element, together with a head distal end face of the piston element, forms the interface.

20. The connector according to claim 18, wherein the sleeve element does not comprise any thermoplastic material at a proximal end thereof, wherein the proximal end of the sleeve element, together with a head distal end face of the piston element, forms the interface, and wherein the head distal end face of the piston element comprises thermoplastic material.

* * * * *

UNITED STATES PATENT AND TRADEMARK OFFICE
CERTIFICATE OF CORRECTION

PATENT NO.        : 8,528,299 B2                                    Page 1 of 1
APPLICATION NO.   : 13/140206
DATED             : September 10, 2013
INVENTOR(S)       : Peter L. Cove et al.

It is certified that error appears in the above-identified patent and that said Letters Patent is hereby corrected as shown below:

On the Title Page, Item (75) Inventors
Change "William R. Valance" to --William E.T. Vallance--

In the Claims

Column 14, line 63 (claim 1, line 1) delete "in"

Column 14, line 63 (claim 1, line 1) after a (second occurrence) insert --in--

Signed and Sealed this
Second Day of December, 2014

Michelle K. Lee
*Deputy Director of the United States Patent and Trademark Office*